United States Patent [19]

Ewald

[11] Patent Number: 4,596,073
[45] Date of Patent: Jun. 24, 1986

[54] APPLE CORER WITH A CORE REMOVER

[76] Inventor: Howard H. Ewald, 2300 E. Patrick La., No. 15, Las Vegas, Nev. 89119

[21] Appl. No.: 571,010

[22] Filed: Jan. 16, 1984

[51] Int. Cl.$^4$ .............................................. A47J 25/00
[52] U.S. Cl. ..................................... 30/113.1; 30/130
[58] Field of Search ................... 30/113.1, 113.3, 278, 30/130

[56] References Cited

U.S. PATENT DOCUMENTS

| | | | |
|---|---|---|---|
| 1,390,977 | 9/1921 | Behr | 30/113.1 |
| 2,213,015 | 8/1940 | Parent | 30/130 |
| 2,615,245 | 10/1952 | Schaumleffel | 30/130 |
| 2,990,615 | 7/1961 | Ohler | 30/113.1 X |

Primary Examiner—Douglas D. Watts
Attorney, Agent, or Firm—Jessup, Beecher & Slehofer

[57] ABSTRACT

An apple corer having four molded plastic components are fitted together to form the invention. They are a hollow cutting tube, a core remover slidable along the cutting tube, a handle attached at the end of the cutting tube, and a compression plug inserted at the same end for locking the handle in place. The tip of the cutting tube has serrated teeth for smooth boring into the apple. In operation, the handle is oscillated while applying pressure to it. This causes the cutting tube to bore through the apple. The tube is removed from the apple and the resulting core left in the tube is ejected by sliding the core remover towards the tip of the cutter. The corer can also be used for partial removal of the apple core when stuffed apples are desired. In this situation prongs are attached to the end of the core remover. The cutter is bored partially into the apple, the core remover is slid against the face of the apple causing the prongs to impale the apple and hold the core in place. The apple is twisted which causes the core to shear off at the tip of the cutter. The partial core in then removed as before.

7 Claims, 11 Drawing Figures

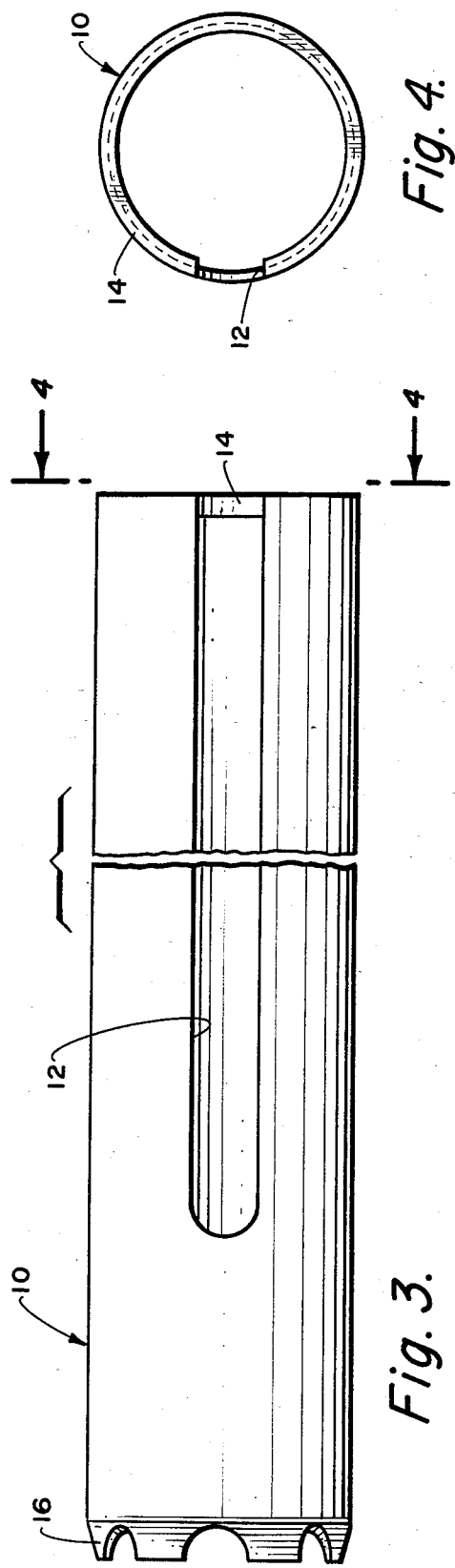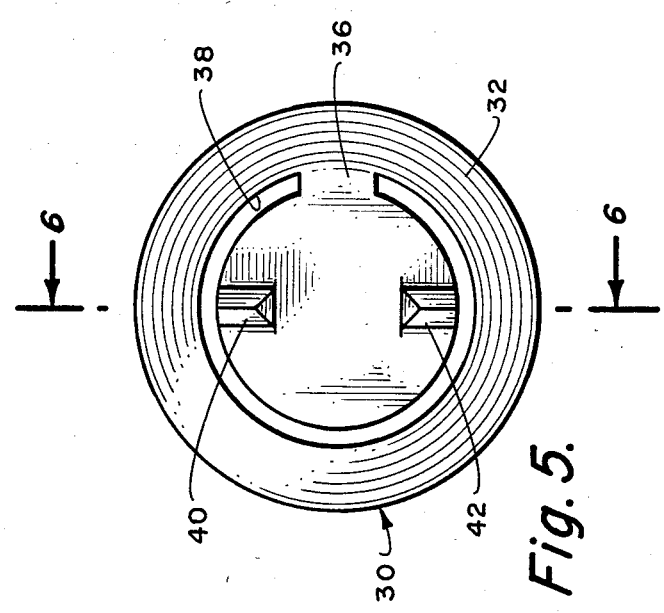

APPLE CORER WITH A CORE REMOVER

BACKGROUND OF THE INVENTION

1. Field of the Invention

Cutlery—tool driving or impacting tool for severing or tearing and removing the core or a plug from a piece of fruit, vegetable or pastry.

2. Description of the Prior Art

Various prior art devices for removing the pit from a piece of fruit such as a cherry are known in the art. Behr U.S. Pat. No. 1,390,977 illustrates one such device. A dish shaped receptacle having a hole in the bottom holds the fruit while spring-operated solid plunger is released to expel the pit out through the hole in the receptacle. Parent U.S. Pat. No. 2,213,015 discloses a combination device for coring, peeling and slicing fruits and vegetables. The cutting edge is sufficiently angled to also serve as a peeler.

The problem apparent in the prior art is the difficulty in removing only part of the core of a piece of fruit such as an apple. Stuffed apples, for example, require only that the center area containing the seeds need be removed, leaving the edible portion of the apple to be eaten and a cavity for holding the stuffing ingredients. The prior art devices are not able to cleanly remove only a partial core from the apple to be stuffed. This need was recognized by the inventor, which resulted in the invention disclosed in this specification.

SUMMARY OF THE INVENTION

The invention is entitled an apple corer since it is normally used to completely or partially remove the core of an apple. The core which contains the seeds and the inedible part of the apple is initially removed thereby eliminating this nuisance. After decoring, the apple can be eaten as is or further cut into pieces and added to salads or the like.

It is to be understood that the invention has other applications other than that of removing the core from an apple. For example, other similar types of fruit or vegetables can be decored in like fashion. The invention could also be used to create cavities in various types of pastries or cakes by inserting the cutter into the item and removing the resulting plug. Thereafter the cavity or hole could be filled with a filling such as whipped cream or frosting.

The invention has four separate pieces, each of which are fabricated from a plastic material by an injection molding process. The first piece is the cutting tube which bores into the apple. It is a hollow tube with tapered cutting teeth at the proximal end of the tube. The tube also has a longitudinal slit for guiding the reciprocal movement of the core remover, which is the second piece of the invention. The core remover is a hollow cylinder having a diameter large enough to slide along the outside circumference of the cutting tube. Within the core remover is a smaller concentric cylinder which is rigidly held in position by a brace connecting the two cylinders. The smaller core reciprocates along the inside of the cutter. The face of this cylinder has two prongs for impaling the face of the apple and its core. The handle is the third piece of the invention. It is slid over the distal end of the cutting tube. The handle is used to grip the invention and to apply force at that end to drive the cutter through the longitudinal center of the apple. The fourth part of the invention is the compression plug which passes through the handle and into the distal end of the cutter. The plug has an annular groove just underneath its cap for mating with the distal lip of the cutter and the annular ring found inside of the distal end of the handle. The plug is pressed in the cutter until these three rings mate which in effect causes the plug to "snap" into place.

The corer can be inserted through the longitudinal center of the apple so that the teeth just pass the seed pouch of the apple. Then the prongs of the core remover are forced through the skin of the apple. The entire assembly is then rotated or oscillated while holding the apple stationary. This causes the partial core of the apple to shear off where the tip of the cutter is located. The corer and partial apple core or plug are then removed. The result is an apple with a cavity now ready for stuffing with other ingredients and then baked.

Accordingly, it is an object of this invention to provide for a thin-walled apple corer having a handle at one end for easy insertion and penetration of the apple for removing the core.

It is another object of this invention to provide for an apple corer which can remove part of the core thereby creating a cavity in the apple for stuffing it.

It is yet another object of this invention to provide for an apple corer which has a core remover slideable in the corer for ejecting the plug of the apple core from the device after the core has been removed from the apple.

BRIEF DESCRIPTION OF THE DRAWINGS

FIG. 3 is a fragmentary elevational view of the cutting tube.

FIG. 4 is a rear elevational view of the cutting tube.

FIG. 5 is a front elevational view of the handle.

FIG. 6 is a longitudinal sectional view of the core remover taken along the line 6—6 of FIG. 5.

DETAILED DESCRIPTION OF THE PREFERRED EMBODIMENT

Figure 1:
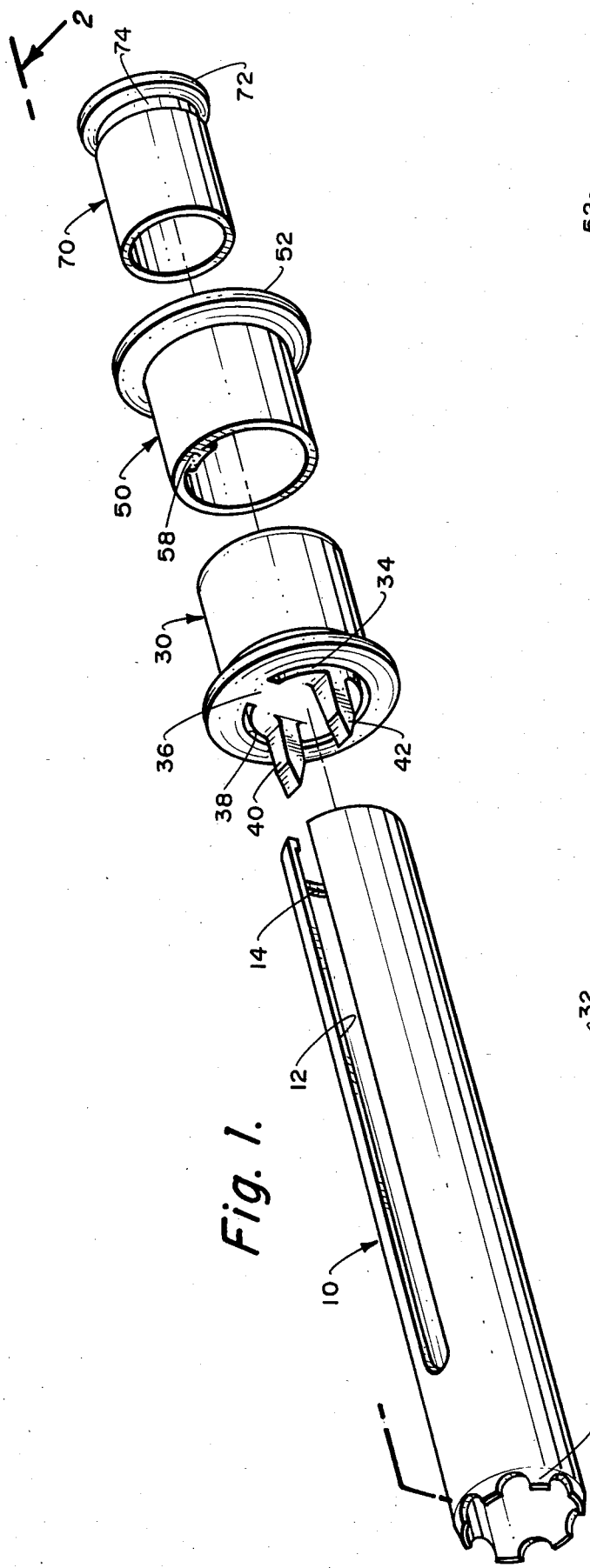
FIG. 1 is an exploded perspective view showing the component members of the apple corer.

FIG. 1 discloses the apple corer showing the four components in an exploded orthographic projection. The four pieces are the cutting tube 10, the core remover 30, the handle 50 and the compression plug 70. As can be seen by FIG. 1, the cutting tube has a longitudinal slit 12 which provides a guide path for the reciprocal movement of the core remover 30. There is an interior lip 14 which is a concentric ring, located around the inside of the distal end of the cutting tube 10 and its function will be discussed in conjunction with the compression plug 70. The cutting tube means has a bore which results from the structure of the cutting tube which is disclosed as an elongate hollow tube 10. There are cutting means 16 at the proximal end of the tube which is disclosed as a plurality of serrated teeth extending from the proximal end of the tube and tapering to sharp edges. The slot 12 is open-ended at the distal end of the tube 10. FIG. 3 and FIG. 4 indicate the thin walled structure of the cutting tube and also the tapered edges of the serrated teeth 16.

The core remover 30 is shown as a front elevational view in FIG. 5 and a cross-sectional view in FIG. 6. The core remover 30 comprises a hollow cylinder having an annular flange 32 around the edge of its proximal end. There is also a smaller concentric cylinder 34 axially placed within the diameter of the core remover 30 and held rigidly in place by a connective brace 36. The core remover 30 and the smaller concentric cylinder have the same axis. This combination forms a C-shaped opening 38. The C-shaped opening allows the core remover 30 to slide in a reciprocal fashion over the wall of the cutter 10. That is, the C-shaped opening is slightly larger than the cross-section of the cutter 10. The connecting brace 36 is narrow enough to fit into the longitudinal slot 12. This provides a guide way for the core remover to slide back and forth along the cutter. There are 2 prongs 40 and 42 extending from the base of the concentric cylinder 34. These prongs are not essential to the operation of the corer but assist whenever the apple has to be partially decored, which will be explained later in the operation on the device.

Figure 2:
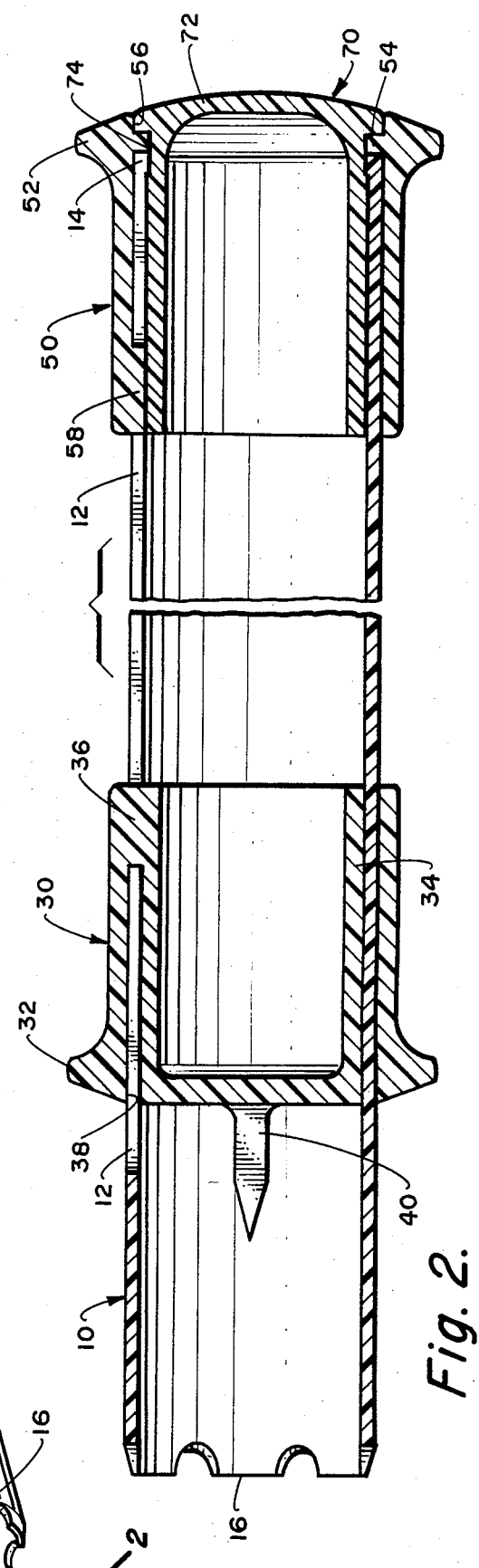
FIG. 2 is a longitudinal sectional view of the corer taken along the lines 2—2 of FIG. 1 after the components have been mated together.

FIG. 2 shows a side elevational view of the corer with part of the tube cut away to show the cooperation between the core remover 30 and the tube 10. As can be seen, the C-shaped opening 38 is a spacing between the smaller cylinder 34 and the core remover 30. This spacing is slightly larger than the thickness of the cutter's wall.

The third piece of the invention is the handle 50. The handle 50 fits over the distal end of the tube 10. The purpose of this handle is to provide a knob or grip for the person using this invention to core the longitudinal center of the apple. The handle 50 has an annular flange 52 at its distal end which also assists in gripping the device. There is an annular ring 54 projecting from the interior wall of the handle 50 which prevents the handle from sliding past the distal end of the tube 10.

Figure 7:
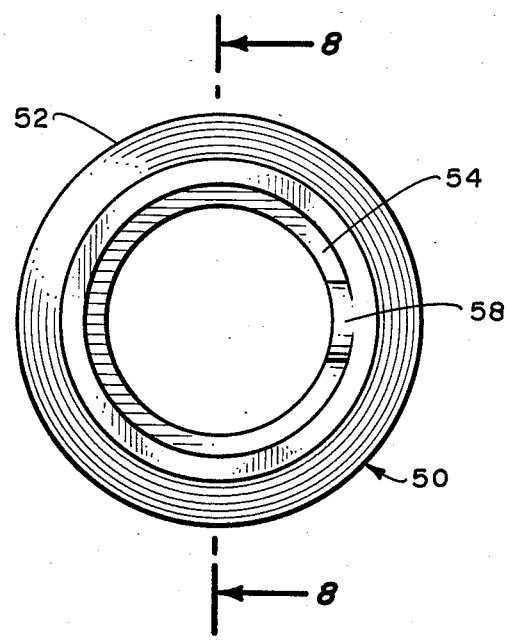
FIG. 7 is a front elevational view of the handle.
Figure 8:
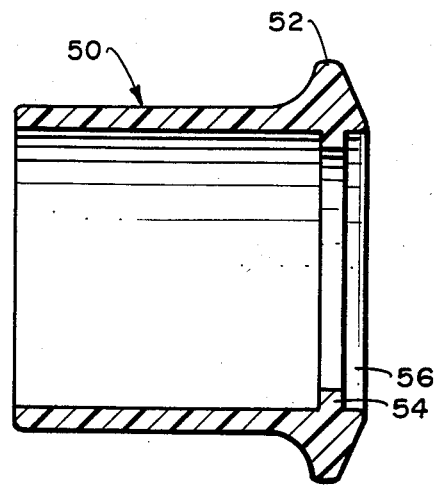
FIG. 8 is a longitudinal sectional view of the handle taken along the line 8—8 of FIG. 7.

FIGS. 7 and 8 show the handle 50 with the annular ring 54 clearly disclosed. It can be seen the handle is a hollow, circular cylinder having a flange 52 on its exterior and annular ring 54 on its interior. The diameter of this annular ring 54 is identical to the diameter of the lip 14 of the tube 10 and they are slightly smaller than the interior diameter of the tube 10. The handle further includes a spline 58 running axially on its interior wall which has a width slightly smaller than the width of the longitudinal slot 12 of the tube. This spline mates with the slot for preventing rotation of the handle relative to the tube 10. That is, the handle cannot rotate about the distal end of the tube 10. This is provided so that when the user of this device turns the handle 50, the tube will also turn.

Figure 10:
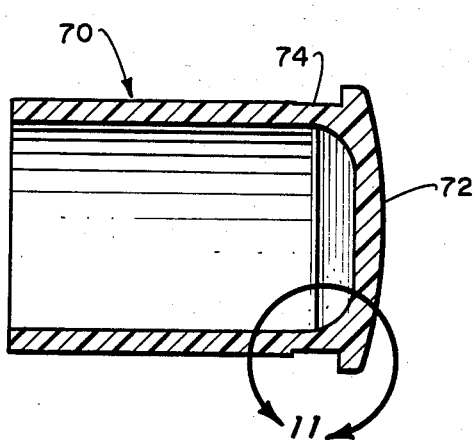
FIG. 10 is a longitudinal sectional view of the compression plug taken along the line 10—10 of FIG. 9.
Figure 9:
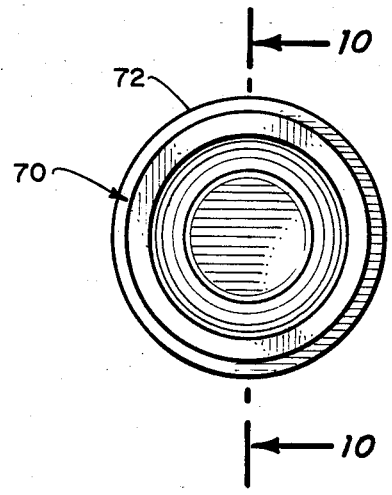
FIG. 9 is a front elevational view of the compression plug.
Figure 11:
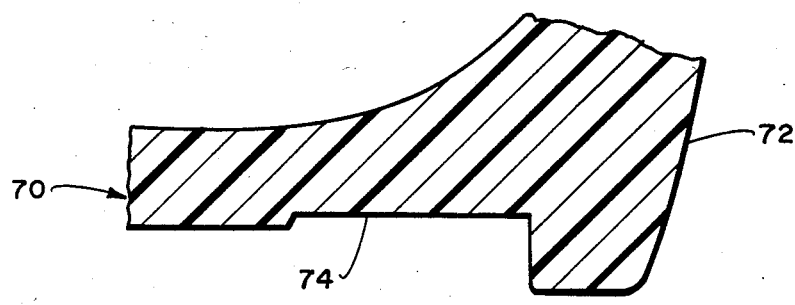
FIG. 11 is a fragmentary close-up of the annular groove of the compression plug as shown in FIG. 10.

The fourth piece of this invention is the compression plug 70 which is shown in a front elevational view in FIG. 10 and a cross-sectional view in FIG. 9. The plug 70 is comprised of a cylindrical member and a cap 72 at its distal end. The diameter of the cylindrical member of the plug is slightly larger than the opening or diameter of the annular ring 54 of the handle 50. The compression plug can be frictionally pressed through this annular ring and accordingly the respective diameters are very close to one another. There is more clearly disclosed in FIG. 11 an annular groove 74 which is on the proximal side of the cap 72. This groove is wide enough to accomodate both the annular ring 54 of the handle 50 and the lip 14 of the tube. The compression plug 70 is forced through the annular ring 54 and all the way down into the bore of the tube 10 until the cap 72 lodges in the seat 56 of the handle. After the plug is snapped into place, the annular groove 74 holds both the lip 14 and the ring 54 as is clearly shown in the cross-sectional view of FIG. 2. This mating causes the cap to be secured in the bore of the cutter and also to keep the handle 50 attached to the distal end of the cutter.

OPERATION OF THE INVENTION

Each piece of the corer is made by an injection molding process from acetal resin, polyethylene or other plastic material. In assembling the apple corer, the tube 10 receives the core remover 30 by inserting the wall through the C-shaped opening 38. Next comes the handle 50 which aligns its spline 58 into the longitudinal slot and slipped over the distal end of the cutter. Lastly the compression plug is pressed through the hole in the handle until it snaps into place. Now the core remover 30 has a limited reciprocal movement between the end of the slot 12 and the face of the handle. The prongs 40 and 42 extend slightly beyond the teeth 16 when the remover is at its maximum movement.

In operation, for right handed people, the circumference of the apple is gripped by the left hand so that the longitudinal center is lined up with the longitudinal center of the cutter. The user of the device grips the handle 50 with the right hand. The teeth 16 are pressed against the end of the apple and the corer is oscillated by the right hand while exerting pressure on the end of the cutter. This reciprocal motion or oscillation causes the teeth 16 to saw into the apple. Further the thin wall construction of the cutter allows a very easy passage into the heart of the apple without too much resistance. As the serrated teeth 16 begin to break through the opposite end of the apple, the user simply grasps the mid-section of the apple and presses onward with the core remover until the corer exits. Thereafter the apple is simply slid off of the cutter 10 and the core remover 30 is slid down by grasping the flange 32 which in turn forces the core or the plug left in the bore to be ejected. This usage does not require the prongs 40 and 42.

In preparing baked stuffed apples, partial removal of the core is required, since a hole running through the entire longitudinal center would allow the stuffing to ooze out of the apple and into the base of the baking pan. The present invention provides a tool or device to remove a partial core from the apple. This is accomplished in the same manner described in removing the core but that the length of the plug to be removed will be predetermined by marking a length of the cutter 10 shorter than the length of the apple. Then the device is inserted into the center of the core until the cutter penetrates to the pre-determined depth. Thereafter, the core remover 30 is slid down so that the two prongs impale the upper ridge of the apple near the stem. With the core prongs in place, the device is rotated by turning the handle. This causes the core to be sheared off at the base where the serrated teeth are. This is so because the prongs cause the partial apple core to turn with the device while the apple is held stationary. After the user feels no more resistance in the turning of the device, the device is removed from the apple and the partial core is simply ejected as previously stated. Thereafter the cavity left in the apple can be stuffed with various ingredients and baked to create stuffed apples.

This plug or partial core removing ability of the present invention could be adapted for removing the heart of a pastry or plugs from a cake, thereby allowing a filling or frosting to be inserted. Furthermore, this device could be used with other types of fleshy fruits which have no stony pit in the center.

Whereas the present invention has been shown and described herein in what is conceived to be the best mode contemplated, it is recognized that departures may be made therefrom within the scope of the invention which is therefore not to be limited to the details disclosed herein but is to be afforded the full scope of the invention.

What is claimed is:

1. An apple corer comprising:
   slotted cutting tube means having a bore for coring the apple;
   a core remover for removing the core left in said bore;
   said core remover further comprising a hollow cylinder and having a smaller concentric cylinder having a face placed axially within said hollow cylinder and held rigidly in position by a brace between said two cylinders thereby creating a C-shaped opening between said two cylinders for allowing said core remover to slide in a reciprocal fashion over said cutting tube means and having said connecting brace slideable in said slot of said tube means;
   hande means attached to said cutting tube means for gripping the apple corer;
   said handle means further comprising a hollow cylinder having an interior wall of sufficient diameter to slideably fit over the distal end of said cutting tube means, said handle means having a spline running longitudinally along said interior wall of said handle and mating with said slot for preventing rotation of said handle about the distal end of said cutting tube means, said handle means having an annular ring projecting from said interior wall for preventing said handle from sliding over said cutting tube means;
   a compression plug having a cylindrical member with a cap at one end for insertion through said annular ring of said handle and into said bore at said distal end of said cutting tube means resulting in a frictional compression fit, said compression plug further having an annular groove on the proximal side of said cap for mating with said annular ring of said handle, and securing said handle and said plug to the distal end of said cutting tube means.

2. The corer as recited in claim 1 wherein said cutting tube means comprises an elongate hollow tube having cutting means at the proximal end and a longitudinal open-ended slot in its wall, opening at the distal end.

3. The corer as recited in claim 1 wherein said cutting means of said cutting tube comprises a plurality of serrated teeth extending from the proximal end of said cutting tube and tapering to sharp edges.

4. The corer as recited in claim 1 wherein said elongate hollow tube is of a thin-walled construction.

5. The corer as recited in claim 1 further comprising an annular flange around the edge of the proximal end of said hollow cylinder of said core remover for providing gripping surface for the hand whenever said core remover is reciprocated.

6. The corer as recited in claim 1 further comprising an annular flange at the distal end of said handle for ease in gripping said apple corer.

7. The corer as recited in claim 1 further comprising an interior lip at the distal end of said cutting tube juxtaposed with said annular ring of said handle;
   said annular groove on the proximal side of said cap of said plug being of sufficient width to accomodate said lip and said annular ring of said handle thereby mutually securing said handle and said plug to the distal end of said cutting tube means.

* * * * *